INVENTOR.
HYRUM M. TALLEY
BY
Hazard & Miller
ATTORNEYS

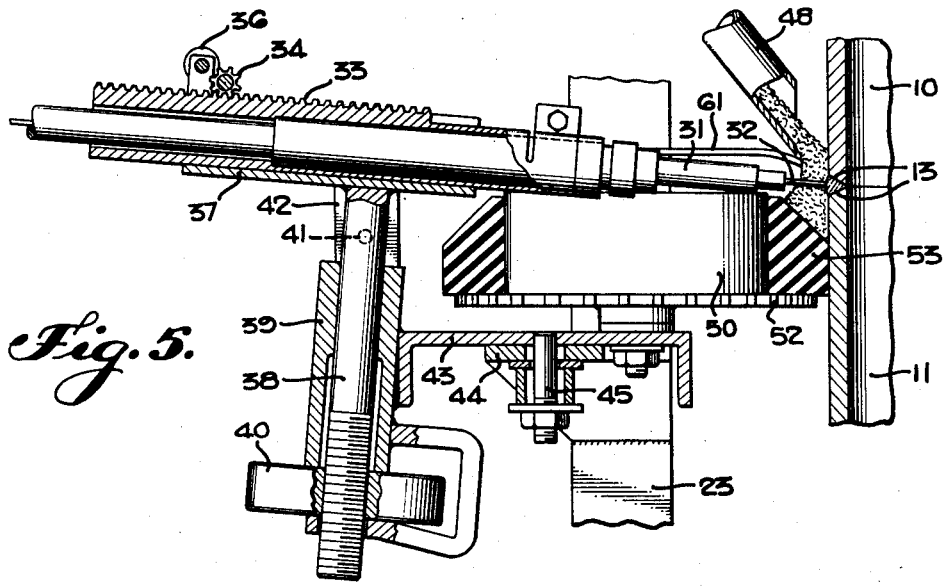
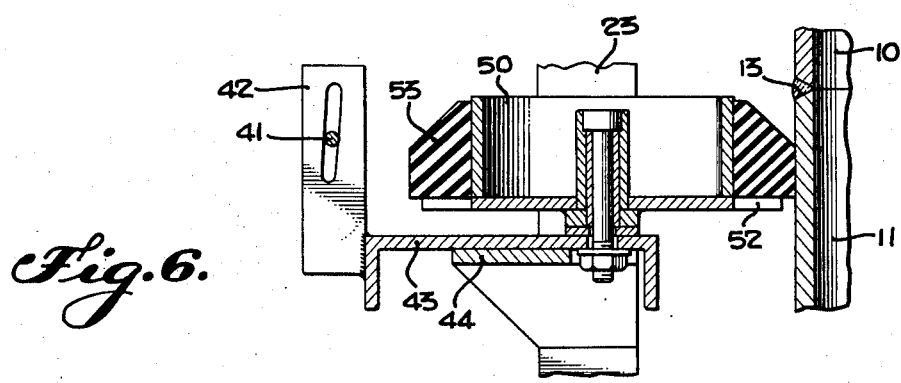
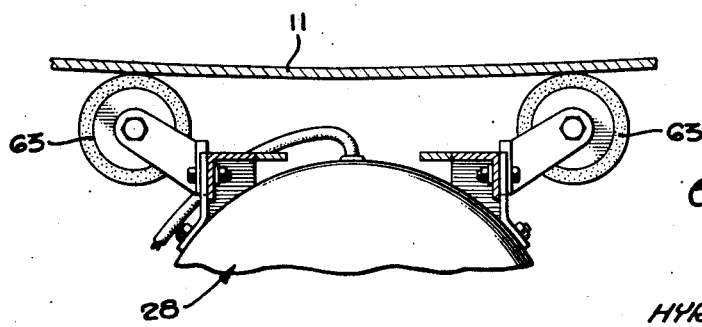

Patented May 18, 1954

2,678,987

UNITED STATES PATENT OFFICE 2,678,987

APPARATUS FOR WELDING ON UPRIGHT SURFACES

Hyrum M. Talley, Alhambra, Calif., assignor, by mesne assignments, to Chicago Bridge & Iron Company Application May 29, 1950, Serial No. 164,944

6 Claims. (Cl. 219—8)

1

This invention relates to a means by which welds may be applied to upright surfaces of work to be welded. The invention particularly is useful in welding horizontal seams between courses of plates used in the construction of storage tanks. In the field construction of storage tanks, after the deck or bottom has been constructed and welded and chines applied thereto, the side walls of the tanks are formed by horizontal courses of steel plates. These horizontal courses are usually erected by first tack-welding an upright plate in position over a lower plate or plates so as to temporarily hold the plates in position. Thereafter the vertical seams between plates of a given course and the horizontal seams between plates of adjacent courses are welded by hand welding. In the case of large storage tanks the welding of the long horizontal seams between adjacent courses becomes very laborious and the merit of the welded joint to a large extent depends upon the skill of the welder.

In relatively recent years a so-called submerged arc method of welding has been developed wherein a welding electrode is fed toward the work while it is being moved along the length of the weld and a granulated flux is fed around the arc so as to maintain it in a completely submerged condition. The advantages of this submerged arc method of welding are well known in that it produces a uniform bead which is of uniformly high merit. However, the submerged arc method of welding has heretofore been restricted in its use to welding on work wherein the weld is deposited or formed on a horizontal surface or a surface which is substantially horizontal. Under such circumstances the flux fed around the arc merely rests on the work in the form of a low mound and the metal deposited by the melting of the welding electrode merely rests by gravity on the surface of the weld. To a limited extent the submerged arc method of welding has also been used to form a weld between a horizontal surface and an upright surface wherein the welding electrode is fed into the corner formed between these two surfaces and the flux is fed so as to fill this corner and thus submerge the arc. The deposited metal being supported by the horizontal surface of the work merely lies against the upright surface.

As far as is known the submerged method of arc welding has never been applied to a vertical surface of work to be welded or to an upright surface that approaches the vertical. This has been due to the fact that no satisfactory means

2 or method has been devised for temporarily supporting the flux against the upright surface which, in order to gain the benefits of the submerged method of arc welding, is essential in order to keep the arc submerged and also to keep the deposited metal of the weld in place long enough so that it has an opportunity to solidify without running or flowing down the upright surface.

An object of the present invention, therefore, is to provide an improved apparatus by which a welding electrode may be fed toward an upright surface on the work to be welded as it is moved relatively thereto in the formation of the welding beam and to provide means for temporarily holding or supporting flux fed to the location of the weld so that it will maintain the arc between the electrode and the work in a submerged condition and will hold the metal deposited in place until the metal has had an opportunity to solidify by cooling.

More specifically, an object of the invention is to provide an apparatus that can be easily and quickly applied to storage tanks in the course of their construction and which will automatically weld the horizontal seams between adjacent courses of plates which form the upright walls of the tanks.

The invention is not restricted in its use to the erection of storage tanks in the field but may be used wherever welds are to be formed on upright surfaces. Thus in the construction of many articles in a plant or shop the tank or other work may be moved relatively to the welding apparatus rather than move the apparatus relatively to the work as in the case of tanks constructed in the field.

Other objects of the invention are to provide an apparatus wherein the flux, after it has been fed toward the weld and has performed its duties in the course of welding, is collected for re-use, it being understood that only a portion of the flux fed to the weld is actually consumed during the welding operation. The balance of the flux which is still useful is automatically collected and may be re-used in the continuing of the welding operation.

With the foregoing and other objects in view, which will be made manifest in the following detailed description and specifically pointed out in the appended claims, reference is had to the accompanying drawings for an illustrative embodiment of the invention, wherein:

Figure 1:
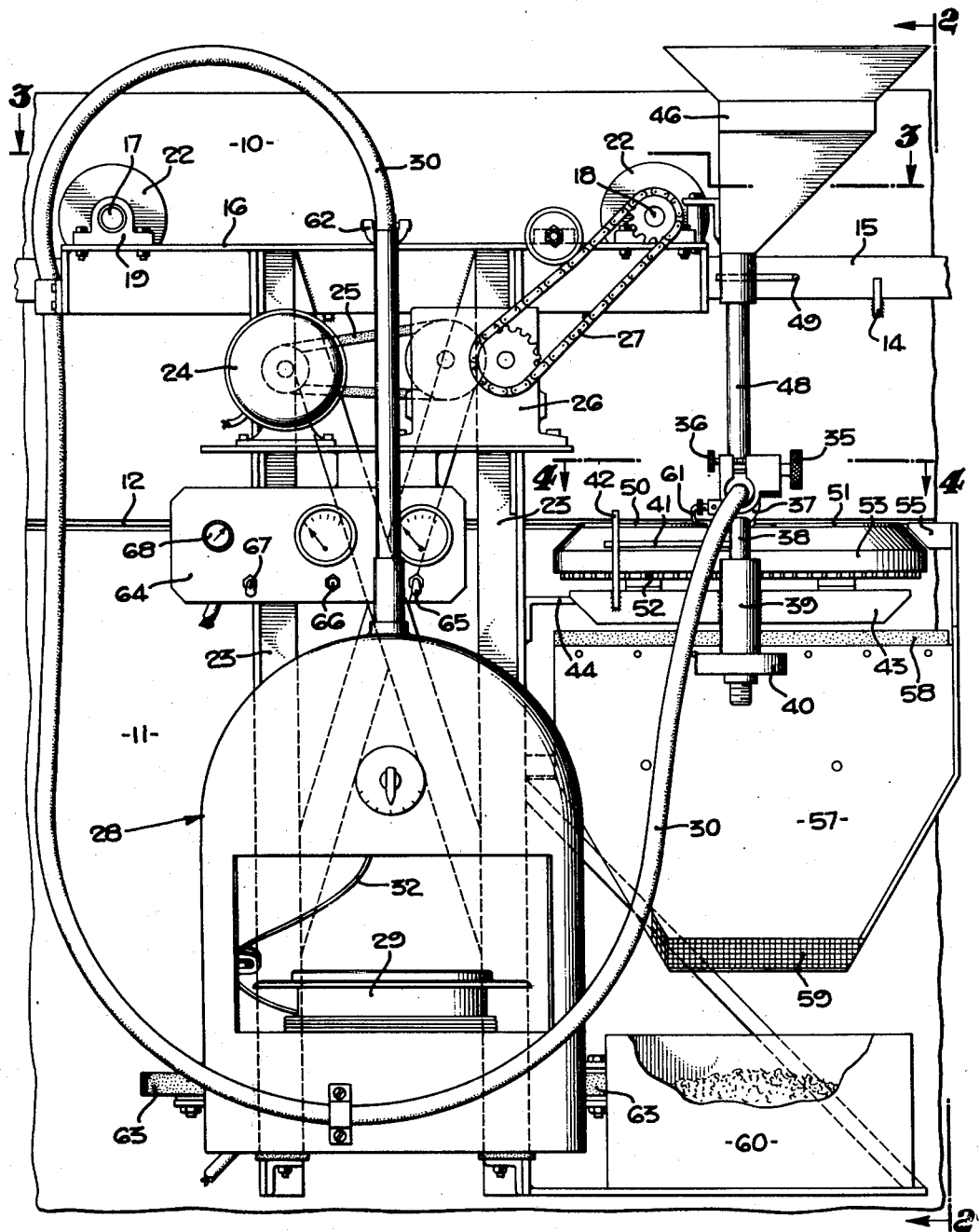
Figure 1 is a view in front elevation of apparatus embodying the present invention illustrating it in applied position to weld a horizontal seam between adjacent courses of plates of a steel storage tank.
Figure 2:
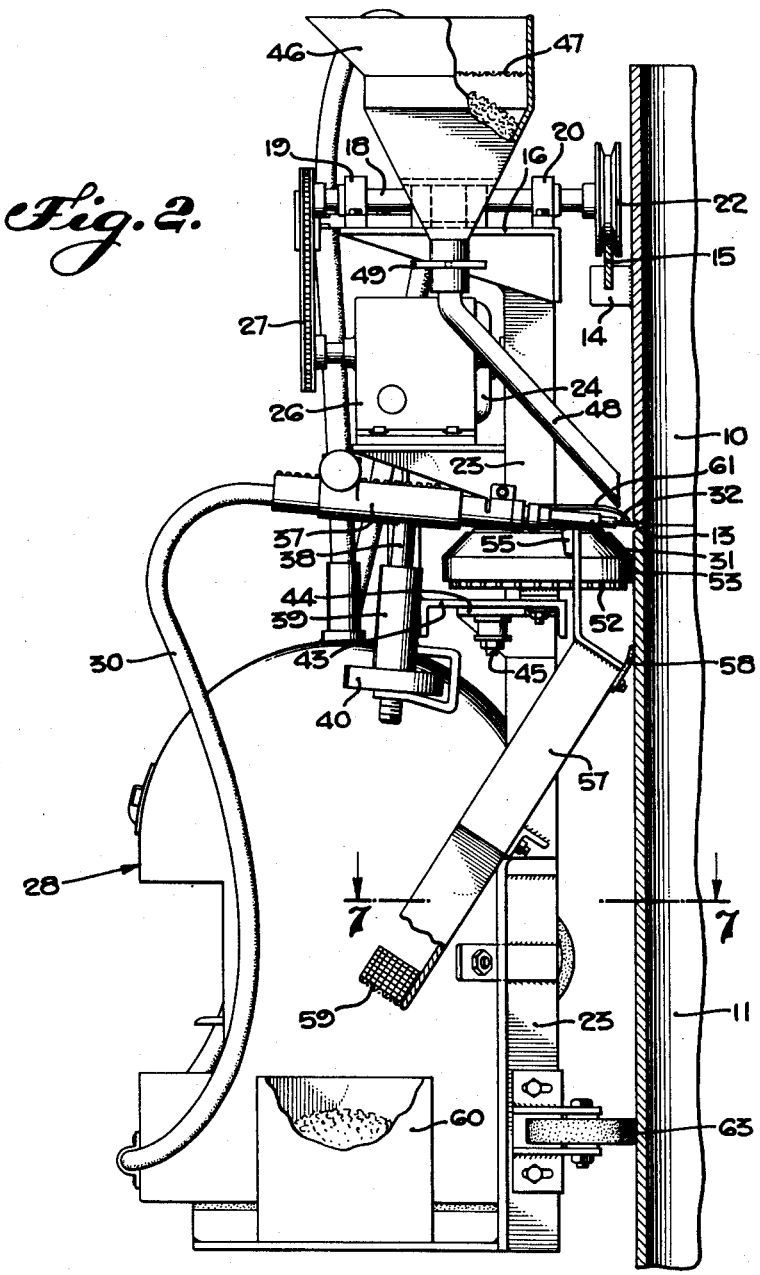
Fig. 2 is a sectional view taken substantially upon the line 2—2 upon Fig. 1 in the direction indicated.
Figure 3:
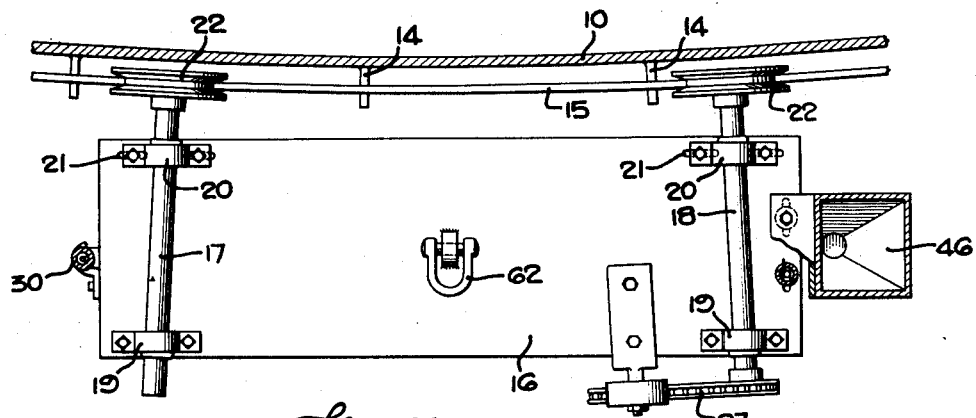
Fig. 3 is a horizontal section taken substantially upon the line 3—3 upon Fig. 1 in the direction indicated.
Figure 4:
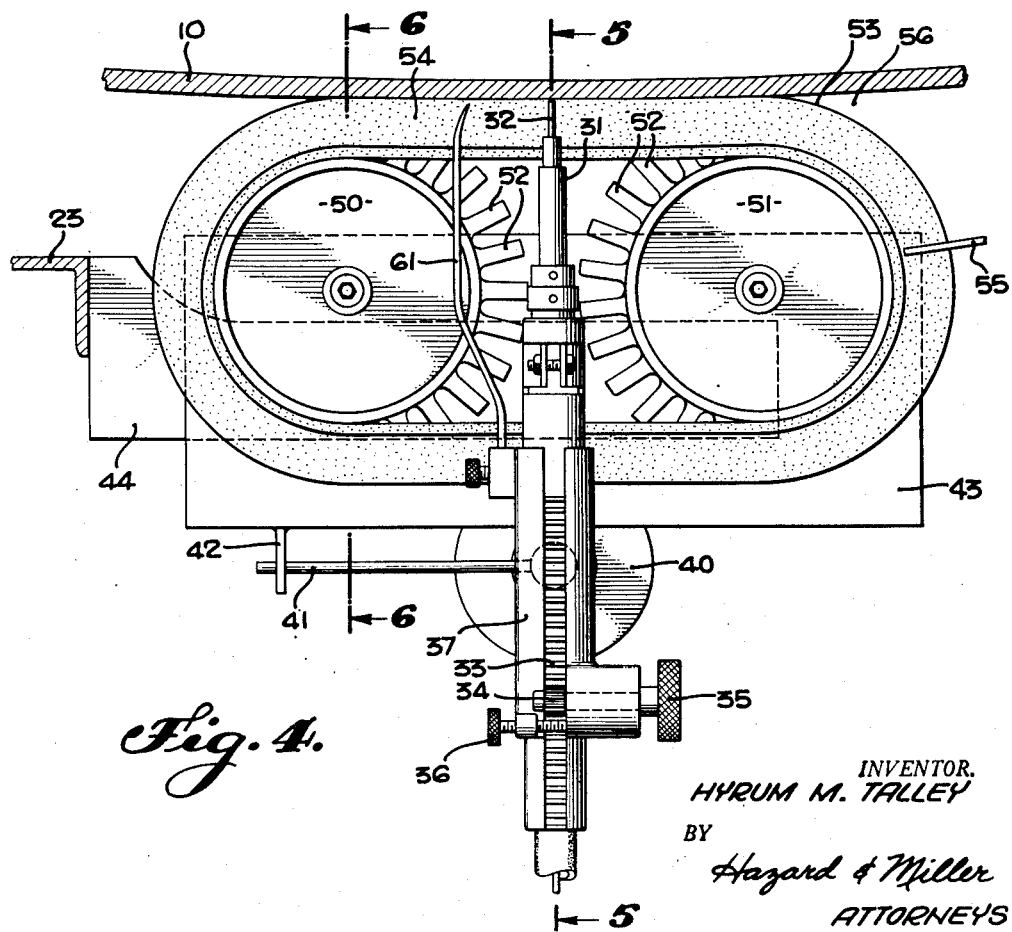
Fig. 4 is a horizontal section taken upon the line 4—4 upon Fig. 1.

Figs. 5 and 6 are sectional views taken substantially upon the lines 5—5 and 6—6, respectively, upon Fig. 4; and Fig. 7 is a horizontal section taken substantially upon the line 7—7 upon Fig. 2.

Referring to the accompanying drawings wherein similar reference characters designate similar parts throughout, 10 indicates a plate of an upper course of plates overlying a plate 11 of a lower course of plates forming a horizontal seam 12 therebetween that it is desired to weld. These plates may be assumed to be plates that are to form the upright walls of a storage tank which have been tack-welded to each other or otherwise supported in upright position. In the case of relatively thin plates, such as those thinner than 3/8", it is not necessary to bevel or scarf the abutting edges of the seam 12. However, in the case of plates that are 3/8" thick or thicker it is usually desirable to bevel these edges, as indicated at 13. The apparatus used to weld the horizontal seam 12 is largely suspended from a track or rail that is temporarily mounted on the upper course of plates. This track or rail is temporarily positioned by means of hangers 14 that are tack-welded to the plates of the upper course in horizontal alignment. These hangers have open-topped slots formed therein designed to receive the rail 15 which is formed of spring steel. This rail is sufficiently thick that it may be sprung or bent to be positioned in the hangers 14 and due to its resiliency it will assume a smooth curve parallel to the curvature of the plates 10, in the event that these plates are curved to form a cylindrical tank. If the upright surface is straight or flat, the rail 15 need not be flexed and will merely assume a straight position.

The apparatus employed consists of a carriage having a top plate 16 on which there are two spaced shafts 17 and 18. These shafts are mounted on the plate by means of self-aligning bearings indicated at 19, the inner bearing holders of which, indicated at 20, are adjustable along the length of the top plate by means of bolts extending through slots 21. This arrangement is employed so that the relationship of the shafts to each other can be varied. Thus if the tank whose plates are to be welded has a relatively large diameter the inner bearing holders will be adjusted so that the shafts 17 and 18 will approach being parallel. On the other hand, if the tank is a relatively small tank the shafts 17 and 18 can be adjusted so as to be arranged on radii from the center of the tank. The shafts carry wheels or rollers 22 which are grooved and which roll upon the top edge of the rail 15.

Below the top plate 16 of the carriage there is mounted on the uprights 23 a reversible electric motor 24. This motor drives through a belt 25 and through a speed reduction gear box 26. An endless chain 27 is trained over a sprocket on the outlet from the gear box 26 and over a sprocket on the end of the shaft 18. This motor thus serves to positively drive the shaft 18 and to cause the carriage to move relatively to the rail 15 at a constant speed. As the motor is reversible the carriage may be driven in either direction with relation to the rail and with relation to the plates 10 and 11.

Near the bottom of the uprights 23 there is mounted the mechanism of a semi-automatic electric welder, generally indicated at 28. The construction of these machines is relatively well known and consequently is not described in detail herein. For purposes of explanation, however, the welding electrode in the form of a supply of welding wire is mounted on a reel 29 from which it is fed at a uniform and constant speed toward the weld. A hose or conduit indicated at 30 has this welding rod or welding wire passed therethrough toward the tip 31 which is located near the work and serves to direct the wire issuing therefrom against the work. The welding wire or welding electrode 32 is connected to one side of a direct current generator the other side of which is grounded or connected to the work formed by the plates 10 and 11 and in the course of welding an electric welding arc is drawn between the work and the electrode which causes the electrode to be melted at its end and to be deposited on the work at the location of the seam 12. The tip 31 is adjustably mounted with relation to the carriage. This tip in conformity with general practice has a rack 33 engaged by a pinion 34 that can be rotated by means of a knurled handle 35 to adjust the tip toward or away from the work. In adjusted position the tip may be locked in place by means of a clamping screw 36. The holder 37 for the tip carries a threaded stem 38 that is slidable through a sleeve 39 and which is screwed into a hand wheel 40 so that by rotating the hand wheel the holder for the tip can be raised or lowered as desired. The stem 38 carries an arm 41 that is slidable in a slot in a bracket 42 so that when the hand wheel 40 is rotated the stem will not rotate sympathetically therewith but will be vertically guided by the engagement of the arm 41 with the slides of the slot in the bracket.

The sleeve 39 is mounted on a plate 43 which in turn is adjustably mounted on an arm 44 on the carriage by means of studs 45 extending through slots in the arm. Thus the entire plate and the structure supported thereby can be adjusted laterally with relation to the carriage.

Over the tip 31 a hopper 46 is mounted on the top plate 16 and serves to carry a supply of welding flux in granulated form. Preferably the entrance to this hopper is covered by a screen 47 so that only granulated flux as distinguished from clinkers can be deposited in the body of the hopper. A tube 48 leads from the bottom of the hopper to a point above and reasonably close to the end of the electrode 32 so as to discharge the granulated flux over the electrode. The rate of discharge can be controlled by means of an adjustable outlet valve 49 arranged in the bottom of the hopper.

As a means for supporting the flux in such a manner as to submerge the arc between the electrode 32 and the work formed by the plates 10 and 11, a pair of spaced rollers 50 and 51 are rotatably mounted on the plate 43. These rollers have at their bottoms outwardly extending flanges which are slotted to form a series of radially extending fingers 52. These fingers collectively serve to support an endless belt 53 formed of rubber or rubber substitute. The rollers serve to press the reach 54 of the belt between the rollers into firm engagement with the lower plate 11 immediately below the seam 12. The top surface of the belt slopes outwardly so as to incline the flux deposited thereon against the upright surface of the work and to hold the flux thereagainst during the short interval of time that the deposited metal is cooling. In this manner the belt is in effect caused to roll against the work and to form a temporary support immediately below the horizontal seam to support the flux so that the arc will remain submerged thereby at all times and the deposited metal will be retained in position until it cools. Near the ends of the endless belt there are scrapers 55 designed to scrape off flux from the belt in the event that it does not fall through the opening indicated at 56 formed where the belt leaves the work and after the flux has performed its function. The flux that drops from the inclined surface of the belt is caught in a hopper 57 mounted on the carriage and which carries a strip of rubber or leather, indicated at 58, in sliding engagement with the upright surface of the work. This flux, on descending through the hopper, passes through a screen 59 and is discharged into a suitable container 60 mounted on the carriage. The flux that is collected in the container 60 may from time to time be used to replenish the supply of flux in the hopper 46. In the normal course of operation some flux frequently works its way down between the belt and the flanges on the rollers 50 and 51. However, the slots between the fingers 52 permit such flux to pass therethrough and into the hopper 57 so that the belt will not be crowded upwardly and caused to rise relatively to the rollers. It will, of course, be appreciated by those skilled in the art that in the course of the electric welding the plate 11 becomes quite warm where it is engaged by the belt 53. However, the reach 54 of the belt remains in contact with the plate for a relatively short period of time and then passes around the rollers before returning to the plate. Consequently, any portion of the belt will have an adequate opportunity to cool between successive engagements with the plate. As a means of locating the position of the machine relatively to the weld an indexing member or pointer 61 is mounted on the tip holder and has its end located horizontally even with the discharging electrode 32. The end of this pointer is usually in advance of the mound of flux that is being continuously formed by the flux discharging through the tube 48 so that the relationship of the electrode 32 to the seam 12 can be ascertained at all times. On the top plate 16 there is mounted a clevis 62 by which the entire apparatus can be lifted and deposited on the rail 15 or removed therefrom. At the bottom of the carriage rollers 63 are mounted which rollingly engage the plate 11 and serve to steady the apparatus in the course of its movement. The carriage also preferably carries a small switchboard 64 on which switches are mounted controlling various circuits. Thus the switch indicated at 65 may be used to control the circuit which causes the tip to be energized. Switch 66 is a double throw switch in circuit with the motor 24 so that on throwing this switch in one direction the motor 24 may be operated in one direction and on throwing the switch 66 in the other direction the motor 24 may be reversely operated. Switch 67 controls the feed apparatus which feeds the electrode or weld wire from the reel 29 to the tip. Various electrical instruments may also be mounted on the switchboard including a voltmeter and an ammeter and an indicator 67 to indicate the travel speed.

From the above described construction it will be appreciated that a novel method and apparatus is provided for welding horizontal seams across upright surfaces or work. In the course of the operation of the machine the welding rod or electrode is continuously fed at a uniform rate while the carriage is moving laterally on the rail 15. During the electric welding operation flux is temporarily supported by the belt 53 in rolling engagement with the work so that the arc is continuously submerged. Furthermore, the flux is held in contact with the deposited metal until the metal has had an opportunity to cool. Thereafter as the belt proceeds around the roller 51, flux is scraped therefrom into the hopper 57 and falls through the opening 56. It will usually be found that some flux adheres temporarily to the surface of the deposited bead but as the bead cools this flux tends to voluntarily separate from the bead or it may be brushed off or knocked off when the welding of the seam is completed. That portion of the flux which is not actually used or consumed in the welding operation is thus collected and returned to the container 60 and may be used over. It will be appreciated by those skilled in the art that the method of welding a horizontal seam or bead against an upright surface is not restricted to the use of the apparatus shown. The tip through which the electrode is discharged could be manipulated by hand but in order to properly weld by means of the submerged arc method of welding against an upright surface some means is necessary to temporarily hold the flux around the arc and against the work. This is satisfactorily accomplished by the use of an endless belt in rolling engagement with the plate 11 and which serves to provide a temporary support for the flux.

When the welding operation is completed the carriage is lifted off of the rail 15 by means of the clevis 62. The rail 15 is then lifted out of its hangers 14 and the hangers 14 are simply knocked off of the plate 10 inasmuch as these hangers are merely tack-welded to the plate. It will be appreciated that the improved apparatus will enable very excellent welds to be formed along the horizontal seams 12 and as the apparatus, when properly adjusted, is entirely automatic, a great deal of hand labor heretofore used in welding horizontal seams can be avoided as many consecutive pieces over the seam to complete the welding thereof may be performed as may be necessary.

Various changes may be made in the details of the construction without departing from the spirit and scope of the invention as defined by the appended claims.

I claim:

1. A device of the class described comprising a carriage, means for mounting the carriage adjacent upright work to be welded having horizontal movement relatively thereto, electrode feeding means on the carriage for feeding a welding electrode toward the work as the carriage progresses relatively to the work, rollers mounted on the carriage on horizontally opposite sides of the electrode feeding means for rotation about vertical axes, a relatively thick endless rubber belt trained over said rollers having a reach therebetween engageable with the work beneath the electrode feeding means so as to support flux against the work, and means for feeding flux onto the belt adjacent the electrode feeding means, said belt having its upper inner corner beveled downwardly toward the work so as to crowd flux against the work.

2. A device of the class described comprising a carriage, means for mounting the carriage adjacent upright work to be welded having horizontal movement relatively thereto, electrode feeding means on the carriage for feeding a welding electrode toward the work as the carriage progresses relatively to the work, rollers mounted on the carriage on horizontally opposite sides of the electrode feeding means for rotation about vertical axes, a relatively thick endless rubber belt trained over said rollers having a reach therebetween engageable with the work beneath the electrode feeding means so as to support flux against the work, and means for feeding flux onto the belt adjacent the electrode feeding means, said belt having its upper inner corner beveled downwardly toward the work so as to crowd flux against the work, the rollers having supporting flanges thereon supporting the belt which are divided into spaced fingers so that flux falling between the work and the belt onto the flanges may work through the spaces between the fingers and thus avoid elevating the belt therefrom.

3. A device as described in claim 1 wherein said means for mounting the carriage comprise wheels, said carriage being swingable through the intermediary of the wheels laterally of the work to bring said belt into engagement with the work.

4. A device as described in claim 1 wherein said carriage includes a frame adapted to swing in a direction laterally toward the upright work for urging said belt against the work by gravity.

5. A device as described in claim 1 wherein said carriage is suspended on said mounting means and is biased from a freely hanging position by engagement with the upright work.

6. A device of the class described comprising a carriage, rolling means for mounting the carriage adjacent upright work to be welded having horizontal movement relatively thereto, electrode feeding means on the carriage for feeding a welding electrode toward the work as the carriage progresses relatively to the work, rollers mounted on the carriage on horizontally opposite sides of the electrode feeding means for rotation about upwardly extending axes, a relatively thick endless belt trained over said rollers having a reach therebetween engageable with the work beneath the electrode feeding means so as to support flux against th work, said carriage being swingable laterally of the work to bring said belt into engagement with the work, and means for feeding flux onto the belt adjacent the electrode feeding means, said belt having its upper inner corner beveled downwardly toward the work so as to crowd flux against the work.

References Cited in the file of this patent

UNITED STATES PATENTS

| Number | Name | Date |
|---|---|---|
| 1,889,319 | McKiernan | Nov. 29, 1932 |
| 2,071,246 | Allen | Feb. 16, 1937 |
| 2,390,560 | Stanley et al. | Dec. 11, 1945 |
| 2,423,190 | Kennedy | July 1, 1947 |
| 2,434,481 | Anderson | Jan. 13, 1948 |
| 2,460,914 | Wright | Feb. 8, 1949 |
| 2,529,812 | Peters | Nov. 14, 1950 |